US007452928B2

(12) United States Patent
Hayakawa

(10) Patent No.: US 7,452,928 B2
(45) Date of Patent: Nov. 18, 2008

(54) COLD WATER-SOLUBLE POLYMER PARTICLES AND METHOD FOR PREPARING THE SAME

(75) Inventor: Kazuhisa Hayakawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 162 days.

(21) Appl. No.: 11/237,857

(22) Filed: Sep. 29, 2005

(65) Prior Publication Data

US 2006/0069193 A1 Mar. 30, 2006

(30) Foreign Application Priority Data

Sep. 30, 2004 (JP) ............................ 2004-285662

(51) Int. Cl.
*C08J 3/12* (2006.01)

(52) U.S. Cl. ........................ 523/340; 523/322; 523/330

(58) Field of Classification Search ................. 523/330, 523/322, 340
See application file for complete search history.

(56) References Cited

U.S. PATENT DOCUMENTS

| | | | | |
|---|---|---|---|---|
| 3,297,583 | A | 1/1967 | Dierichs et al. | |
| 4,654,086 | A * | 3/1987 | Baird et al. | 106/205.1 |
| 4,909,634 | A | 3/1990 | Suzuki et al. | |
| 5,003,060 | A | 3/1991 | Vinot | |
| 5,391,359 | A * | 2/1995 | Patel | 427/180 |
| 5,547,683 | A * | 8/1996 | Yano et al. | 424/501 |
| 5,547,693 | A * | 8/1996 | Krochta et al. | 426/90 |
| 6,197,100 | B1 | 3/2001 | Melbouci | |
| 2004/0209080 | A1 * | 10/2004 | Hayakawa et al. | 428/402 |
| 2005/0261399 | A1 * | 11/2005 | Hunkeler | 524/56 |

FOREIGN PATENT DOCUMENTS

| | | | |
|---|---|---|---|
| EP | 1 469 031 | A2 | 10/2004 |
| EP | 1 469 031 | A3 | 11/2005 |
| JP | 42-6674 | | 3/1968 |
| JP | 48-6622 | | 2/1973 |
| JP | 6-166026 | | 6/1994 |
| JP | 2000-63565 | | 2/2000 |

OTHER PUBLICATIONS

European Search Report dated Dec. 21, 2005, issued in corresponding European Application No. 05255927.

* cited by examiner

*Primary Examiner*—Tae H Yoon
(74) *Attorney, Agent, or Firm*—Westerman, Hattori, Daniels & Adrian, LLP.

(57) ABSTRACT

A method for preparing cold water-soluble polymer particles is described. The method includes subjecting a liquid containing a wetting agent or a powder of the wetting agent to dropping or spraying over or mixing with a starting water-soluble polymer particles while fluidizing the starting polymer particles without subsequent forced drying and grinding of the resulting particles. According to the invention, a powder or particulate product of a cold water-soluble polymer having excellent water wettability and capable of being quickly dissolved in water without formation of undissolved powder can be reasonably prepared and obtained from powdery or particulate water-soluble polymers without resorting to forced drying operations.

6 Claims, 1 Drawing Sheet

COLD WATER-SOLUBLE POLYMER PARTICLES AND METHOD FOR PREPARING THE SAME

CROSS-REFERENCE TO RELATED APPLICATION

This non-provisional application claims priority under 35 U.S.C. §119(a) on Patent Application No. 2004-285662 filed in Japan on Sep. 30, 2004, the entire contents of which are hereby incorporated by reference.

BACKGROUND OF THE INVENTION

This invention relates to cold water-soluble polymer particles or particulate product having excellent wettability with water and capable of quickly dissolving in water without forming undissolved powder (undissolved lump of flour) and also to a method for preparing such particles.

Water-soluble polymers have been hitherto employed in various fields of cosmetics or building materials using cements. Water-soluble cellulose ethers are particularly useful as a water-soluble polymer. They are prepared by providing pulp as a starting material, subjecting to acetylation reaction in an alkaline solution, followed by etherification reaction, and washing in hot water or in an organic solvent containing water. Thereafter, the resulting purified water-soluble cellulose is isolated from the solution by filtration, dried with hot air and ground to pieces.

The water-soluble polymer particles such as water-soluble cellulose ethers obtained according to the above procedure have the following problems.

The particles of the water-soluble polymer such as the water-soluble cellulose ether prepared as above are poor in solubility and requires a long time for dissolution since the surface portion of each water-soluble polymer particle is readily dissolved in water to form a strongly tacky film at the surface thereof upon dissolution, whereby the polymer particles adhere each other by stirring upon dissolution to form large undissolved lump of flour. To prevent the formation of undissolved lumps of flours, for one type of water-soluble polymers such as methyl cellulose, hydroxypropylmethyl cellulose, hydroxyethylmethyl cellulose and the like, a complicated procedure of slowly dispersing the cellulose ether in hot water provided beforehand and gently cooling for dissolution has been adopted so as to make use of their properties of not being dissolved in hot water of 90° C. or over. For an other type of water-soluble polymers such as polyethylene oxide, sodium polyacrylate and the like, a complicated procedure has also been adopted wherein dispersion is carried out in water especially in a high-speed agitating device so that undissolved powder is not left, followed by dissolution under agitation.

In order to avoid such problems described above, JP-B 48-6622 has proposed a method of preventing undissolved powder from being left in cold water, in which 0.01 to 15 parts by weight of at least one plasticizer selected from ether, ester and amine plasticizers is added to water-soluble cellulose ether powder, uniformly mixed and dried, and crushed to coarse particles. With the coarse particles obtained by this method, however, the plasticizer is mixed with a wetting agent to obtain granules to lumps, which are dried and subsequently ground to pieces. In this way, such a dense product that has been eventually obtained by mixing and densifying during the mixing and drying steps is ground, thus resulting in granules having fibrous portions and fine powder to granules having fibrous fractions on the surfaces thereof to cause undissolved powder to be formed in cold water. To prevent this, a great amount of water is charged when the powder is mixed after addition of a plasticizer so that an apparent bulk density is increased, after which the resulting mixture is dried and pulverized. This may cause a problem in that the bulk density of the resulting granules becomes too high and thus, it takes a long time for dissolution.

In JP-A 6-166026, there is proposed a granulation method wherein particles or granules obtained by use of a specific type of granulator are dried to provide spherical granules which have a reduced amount of fibrous matters, are substantially uniform and close to a sphere in shape, and are almost constant with respect to particle size. Nevertheless, this method cannot prepare granules that can prevent occurrence of undissolved powder in cold water. This is because wettability of water-soluble cellulose ethers is so poor that infiltration of water into the thus prepared, individual granules becomes inadequate.

On the other hand, with water-soluble cellulose ethers, an attempt has been made in JP-B 42-6674, in which a crosslinking agent such as a dialdehyde is applied onto the powder surfaces so as not cause undissolved powder to be formed in cold water, and after dispersion of the powder, the crosslinked structure is destroyed by addition of an alkali component, thereby facilitating solubility. Moreover, in JP-A 2000-63565, there has been proposed preparation of particles which are obtained by adding a crosslinking agent, an acid and a wetting agent to a water-soluble cellulose ether and wherein the content of particles passing through a 30 mesh sieve is not higher than 30% by weight and the residual amount on a 200 mesh sieve is not higher than 30% by weight. Such particles are free of powder dust and excellent in wettability with water, and can be dissolved within a short time without forming undissolved powder in cold water. In this connection, however, monoaldehydes such as formaldehyde, butylaldehyde, glycerine aldehyde and the like, and dialdehydes such as glyoxal, acetaldehyde, terephthalaldehyde and the like exhibit mutagenic properties, and there is concern about an environmental and hygienic problem as would be caused by the mutagenic properties. On the other hand, when crosslinking agents of expensive silicon compounds including alkylalkoxysilanes such as tetramethoxysilane, methyltrimethoxysilane, dimethyldimethoxysilane and the like are added, compatibility may become worsened in some cases, with the attendant problem that use can not be made for cosmetics or agents for suspension polymerization.

SUMMARY OF THE INVENTION

An object of the present invention is to provide a method for preparing cold water-soluble polymer particles such as of a water-soluble cellulose ether, wherein undissolved powder (undissolved lump of flour) is prevented from occurring and solubility in cold water is improved, and also to provide cold water-soluble polymer granules or particles obtained by the method.

As a result of intensive studies for the achievement of the above object, we have found that while fluidizing particles of a water-soluble polymer, such as water-soluble cellulose ether, a solution or powder of a wetting agent is dropped or sprayed over or mixed with the particles, under which when the resulting mixture is used as it is without forcedly drying and grinding, there can be obtained cold water-soluble polymer particles having excellent quick solubility in cold water. The invention has been accomplished based on this finding.

It will be noted that we have already proposed, in an earlier Japanese Patent Application No. 2003-113742, a method of preparing a non-ionic cellulose ether, characterized in that while fluidizing powder of a non-ionic cellulose ether, a powder-binding solution containing a wetting agent is dropped or sprayed over the powder, followed by drying to obtain particles without grinding. With this method, it is necessary to make particles having an appropriate particle size during the course of both the mixing and drying steps. Especially, the drying step is essential in the method, so that facility and utility costs required for the drying at the preparation stage may disadvantageously become high in some case. The invention overcomes this disadvantage.

Accordingly, the invention provides a method for preparing cold water-soluble particles, characterized in that while fluidizing water-soluble polymer particles, a liquid containing a wetting agent or a powder of the wetting agent is dropped or sprayed over or mixed with the particles, and the resulting particles are provided as they are without forcedly drying and grinding into pieces.

In this case, the wetting agent is preferably selected from a group consisting of nonionic surface active agents, anionic surface active agents and cationic surface active agents. The starting particles and the final particles are, respectively, preferably in the form of a powder wherein the amount thereof passing through a sieve of Sieve No. 140 (with an opening of 106 μm) defined in the Japanese Pharmacopoeia 14$^{th}$ edition B-1061 is 30% by weight or over. Or, the starting particles and the final particles are, respectively, preferably in the form of a powder product wherein the amount thereof passing through a sieve of Sieve No. 140 (with an opening of 106 μm) defined in the Japanese Pharmacopoeia 14$^{th}$ edition B-1061 is less than 30% by weight, and a residual amount on a sieve of Sieve No. 30 (with an opening of 500 μm) is 10% by weight or below. The water-soluble polymer is preferably methylcellulose, hydroxyethyl cellulose, hydroxypropyl methylcellulose, hydroxyethyl methylcellulose, hydroxyethyl ethylcellulose, hydroxyethyl hydroxypropyl cellulose, hydroxypropyl cellulose, hydroxybutyl cellulose, or carboxymethylcellulose.

In the above method for preparing cold water-soluble polymer particles, it is preferred that one or more rotary shafts of an agitating blade of an agitator for causing the water-soluble polymer particles to be flown are disposed horizontally, and at least one rotary shaft is rotated at 1,500 rpm or over, to fluidize the water-soluble polymer particles. The present invention also provides the cold water-soluble polymer particles obtained by the above method.

According to the invention, a powder or particulate product of a cold water-soluble polymer having excellent water wettability and capable of being quickly dissolved in water without formation of undissolved powder (undissolved lump of flour) can be reasonably prepared and obtained from powdery or particulate water-soluble polymers without resorting to forced drying operations.

DETAILED DESCRIPTION OF THE PREFERRED EMBODIMENTS

Figure 1:
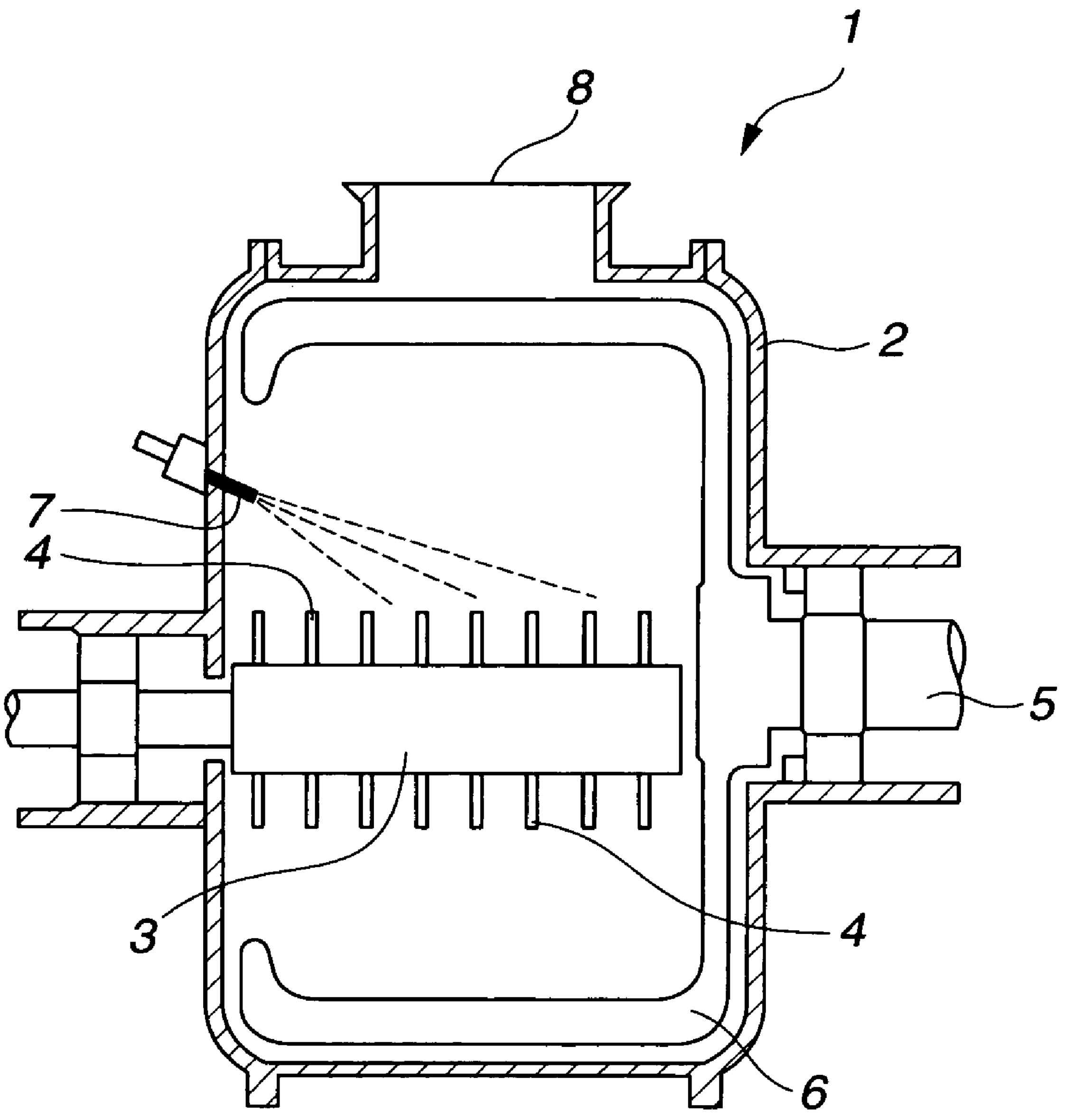
FIG. 1 is a schematic sectional view showing an example of an agitator used in the practice of the invention.

The method for preparing cold water-soluble polymer particles according to the invention includes fluidizing water-soluble polymer particles, under which a liquid or powder containing a wetting agent is dropped or sprayed over, or mixed with the polymer particles.

The water-soluble polymer particles used in the invention include powders or particles of water-soluble cellulose ethers such as methyl cellulose, hydroxyethyl cellulose, hydroxypropyl methylcellulose, hydroxyethyl methylcellulose, hydroxyethyl ethylcellulose, hydroxyethyl hydroxypropyl cellulose, hydroxypropyl cellulose, hydroxybutyl cellulose, carboxymethylcellulose and the like, sodium polyacrylate, polyethylene oxide and derivatives thereof, polyvinyl alcohol, and the like.

In the present invention, the wetting agent adheres and spread to the surface of each water-soluble polymer particle to form a thin film, whereby the surface portion of each water-soluble polymer particle is readily dissolved in cold water without forming tacky films when the polymer particles are introduced in cold water, thereby preventing the water-soluble polymer particles from adhering each other by stirring upon dissolution.

Although ethylene glycol, propylene glycol, glycerine and the like may be used as a wetting agent, surface active agents having the capability of permitting water to be infiltrated are preferred. Surface active agents having such capability are not critical with respect to the type thereof, and are selected from nonionic surface active agents, anionic surface active agents and cationic surface active agents.

Examples of the nonionic surface active agent include higher fatty acid ethers of polyoxyethylene such as polyoxyethylene oleyl ether, polyoxyethylene lauryl ether, polyoxyethylene steary ether and the like, higher fatty acid esters of polyoxyethylene such as polyoxyethylene monooleate, polyoxyethylene laurate, polyoxyethylene stearate and the like, fatty acid esters of sorbitan such as sorbitan stearate and the like, fatty acid esters of glycerine or polyglycerine such as monolauric acid decaglycerine and the like, fatty acid esters such as polyoxyethylene sorbitan ethers such as polyoxyethylene sorbitan laurate and the like, and copolymers of polyoxyethylene and polyoxypropylene. Of these, surface active agents having a hydrophilic-lipophilic balance (HLB) value of 10 or over such as sorbitan caprate, sorbitan caproate and the like are preferred because of excellent wettability thereof.

Examples of anionic surface active agent include sulfosuccinic acid esters or salts thereof such as sodium sulfosuccinate and the like, alkylbenzenesulfonates such as sodium dodecylbenzenesulfonate, and fatty acid sulfates such as sodium laurylsulfate. Of these, sulfosuccinic acid esters and salts thereof are preferred, and sodium dioctyl sulfosuccinate is more preferred because of its excellent ability of enhancing the wetting effect of hydroxypropyl methylcellulose among water-soluble cellulose ethers and also of excellent transparency of the resulting aqueous solution after dissolution.

For a cationic surface active agent, mention is made of octadecyltrimethylammonium chloride and the like.

The wetting agent should preferably be selected from one or more of an aqueous solution of 30 to 80% by weight of sodium dioctyl sulfosuccinate, sorbitan caprylate, sorbitan caproate, polyoxyethylene sorbitan fatty acid esters, and a copolymer of polyoxyethylene and polyoxypropylene.

The amount of the wetting agent is preferably within a range of 0.1 to 3 parts by weight, preferably 0.5 to 1 part by weight, per 100 parts by weight of a water-soluble polymer. When the amount is less than 0.1 part by weight, wettability with water is not improved. On the other hand, when the amount exceeds 3 parts by weight, the corresponding effect of addition of a wetting agent may not be expected.

The water-soluble polymers used in the practice of the invention are prepared by ordinary industrial processes. Especially, powders of cellulose ethers are prepared, for example, by known procedures. More particularly, pulp is provided as a starting material, and after acetylation and etherification reactions, is rinsed with hot water or a water-containing organic solvent and neutralized, if necessary, followed by removal of the solution by filtration and drying to obtain a water-soluble cellulose ether. Thereafter, the water-soluble cellulose ether is ground into pieces, for example, by an impact pulverizer to finally obtain a powder or particles of the water-soluble cellulose ether. It will be noted that the size of the particles (i.e. a size of a starting water-soluble polymer particles) is substantially equal to a size attained after dropping, spraying or mixing of a liquid containing a wetting agent or a powder of the wetting agent (i.e. a size of the thus treated, intended cold water-soluble polymer particles).

The powder of the resulting water-soluble cellulose ether is dissolved to make a 2% by weight aqueous solution prepared by measuring the viscosity at 20° C. by means of a rotational viscometer or capillary viscometer. To check the viscosity at this stage is convenient in that the viscosity after the treatment with a surface active agent according to the invention can also be checked.

The particles of the water-soluble cellulose ether obtained by such a procedure as set out hereinbefore are commercially available under the commercial name of Metolose from Shin-Etsu Chemical Co., Ltd., under commercial name of Methocel from Dow Chemical Company, under the commercial names of Benecel and Natrosol from Aqualon, under the commercial name of Tylose from SE-TYLOSE GmbH & Co. KG, under the commercial name of Walocel from Wolff Cellulosics, and under the commercial name of Nisso HPC from Nippon Soda Co., Ltd.

Next, a wetting agent such as a surface active agent or its solution is added to the thus obtained water-soluble polymer particles. To this end, the water soluble polymer particles are placed in a agitator or a fluidized bed apparatus capable of fluidizing the particles without grinding into pieces, and while agitating the particles, necessary water and wetting agent are dropped or sprayed over, or added to or admixed with the particles such as by use of a spray for the purpose of uniform application to the particles, thereby obtaining particles which are improved in cold water solubility to a desired extent. In this case, the resulting intended cold water-soluble polymer particles are used as they are without subsequent drying (forced drying) and grinding into pieces. The term “without drying” means not to forcedly dry the particles such as under heating or reduced pressure conditions, but with the exception that the particles are allowed to stand at room temperature and are naturally dried. More particularly, the thus obtained, intended particles are allowed to stand at room temperature, under which moisture in the particles is evaporated to permit a state where moisture is reduced in content.

The amount of water added should preferably be a minimum amount necessary for adjusting to such a low viscosity as to enable a wetting agent, such as a surface active agent, to be dropped and sprayed upon mixing, and should be at such a level that after the dropping, spraying or mixing, the water-soluble polymer particles, naturally dried, are not mutually attached to one another. The amount of water added for this purpose is preferably within a range of 0 to 40 parts by weight per 100 parts by weight of the water-soluble polymer, more preferably 0 to 30 parts by weight. The addition of water in larger amounts leads to the possibility that the particles are mutually attached to one another unless dried and results in masses of the particles during storage.

The rate of feed of a wetting agent aqueous solution (powder binding solution) is in the range of 1 to 500 g/minute, preferably 2 to 20 g/minute. If the feed rate is lower, it takes a long time before obtaining an intended product with concern that the productivity becomes poor. On the other hand, when the feed rate is higher, the wetting agent does not attach uniformly to powder of a water-soluble polymer with the possibility that wettability against water is not improved.

The agitator device suited in the present invention is, for example, one shown in FIG. 1. An agitator device 1 has a treating vessel 2, and a first rotary shaft 3 which is rotatably inserted into the treating vessel 2 along a horizontal direction substantially at a central portion along the height of one side of the treating vessel 2. The first rotary shaft 3 has a number of agitation rotary blades 4 at the outer periphery thereof and is rotated by means of a driving device such as a motor, not shown. This enables the integrally assembled agitation rotary blades 4 to be rotated in the same direction. At other side of the treating vessel 2 in face-to-face relation with the side through which the first rotary shaft 3 is inserted into the treating vessel 2, a second rotary shaft 5 that is rotated in a direction opposite to the first rotary shaft 3 by means of a driving device (not shown) such as a motor is provided. The second rotary shaft 5 has a ribbon-shaped or basket-shaped agitation blade 6, attached at a tip portion thereof projecting toward the treating vessel 2, which is arranged along an inner wall at other side, an inner wall at the upper portion and an inner wall of the bottom of the treating vessel 2. When the second rotary shaft 5 is rotated, the agitation blade 6 is rotated along with the shaft 5 in a direction opposite to the rotary direction of the agitation rotary blades 4 of the first rotary shaft 3. It will be noted that in FIG. 1, reference numeral 7 indicates a fluid nozzle supplying a liquid containing a wetting agent or a wetting agent powder. The water-soluble polymer particles are fed from a charge port 8 formed at an upper portion of the treating vessel 2.

In the case, the fluidizing velocity of the particles is such that when 0.5 kg of particles of a water-soluble polymer such as a water-soluble cellulose ether is placed in a 2-liter container having a diameter of 250 mm wherein one agitation rotary blade is horizontally provided at a central portion of the treating container such as Spartan-ryuzer of Dalton Co., Ltd. as shown in FIG. 1, the velocity is preferably in the range of 1,500 to 10,000 rpm, more preferably 2,000 to 7,000 rpm, in terms of the speed of the rotary blade. If the speed is lower, there is concern that the wetting agent is not attached uniformly. On the other hand, when the speed is higher, the wear of the rotary blade is intensive, with concern that the device suffers damages.

It is preferred to use, as shown in FIG. 1, an agitator device having such a structure that a ribbon-shaped or basket-shaped agitation blade that rotates in a direction opposite to the agitation rotary blades is disposed horizontally outside of the agitator rotary blades and has a rotating mechanism. More particularly, the reason why the ribbon-shaped or basket-shaped agitation blade that is rotated in the opposite direction relative to the agitation rotary blades is preferably disposed is that to make a flow in a direction opposite to the flow of the particles created by means of the rotary blades ensuring high-speed agitation is able to realize uniform agitation without causing the fluid particles to be convected within the agitation vessel. The rotation speed of the agitation blade is within a range of 10 to 1,000 rpm, preferably 20 to 100 rpm. If the rate is lower, the stagnation of the particles may not be suppressed. When the rate is larger, mutual collision of the particles occurs so frequently that fracturing action may undesirably take place in some case.

The temperature at which a liquid of a wetting agent is fed to the particles is preferably within a range of 5 to 50° C. Lower temperatures makes the wetting agent more viscous, with concern that uniform deposition is not ensured. High temperatures enables an aqueous solution containing a wetting agent to be evaporated, with concern that uniform deposition is not achieved.

The size of the resulting cold water-soluble polymer particles is not critical so far as the particles are unlikely to form undissolved powder on charge into cold water and dissolution thereof is allowed to proceed. With powder, the amount of powder passing through a sieve of Sieve No. 140 (with an opening of 106 μm) described in the 14$^{th}$ revised edition of Pharmacopoeia B-1061 is 30% by weight or over, preferably 70% by weight or over and more preferably 90% by weight or over. With particles, an amount thereof passing through a sieve of Sieve No. 140 (with an opening of 106 μm) described in the 14$^{th}$ revised edition of Pharmacopoeia B-1061 is less than 30% by weight, and a residual amount on a sieve of Sieve No. 30 (with an opening of 500 μm) is 10% by weight or below.

The powder and particles of a cold water-soluble polymer such as a cold water-soluble cellulose ester obtained according to the invention can be dissolved in cold water without forming undissolved powder (undissolved lump of flour) in cold water as is experienced with conventional particulate products and without requiring a long time for dissolution. More particularly, particles such as of methylcellulose, hydroxypropyl methylcellulose, hydroxyethyl methyl cellulose and the like are insoluble in hot water, and have been dissolved according to a procedure wherein such a cellulose ether powder is dispersed in hot water provided beforehand, followed by gentle cooling for dissolution. The particles of a cold water-soluble polymer according to the invention can be quickly dissolved in cold water of exceeding 0° C. to room temperature or in water of 5 to 70° C.

More specifically, when 2 wt % water-soluble polymer aqueous solution is prepared, it is preferred that water-soluble polymer particles are completely dissolved in water within 60 minutes, preferably within 30 minutes in case that the water-soluble polymer particles are introduced in water at 0 to 25° C. and stirred with an agitator at 700 rpm.

EXAMPLES

Examples are shown to more particularly illustrate the invention, which should not be construed as limiting the invention thereto. Comparative examples are also shown.

Example 1

0.5 kg of a powder (a residual amount on a sieve of Sieve No. 30 (with an opening of 500 μm) described in the Japanese Pharmacopoeia 14$^{th}$ edition B-1061 is 0%, an amount of powder passing through a sieve of Sieve No. 140 (with an opening of 106 μm) is 82% by weight, with an average particle size of 64 μm) of hydroxypropyl methylcellulose (commercial name of Metolose 60SH-10000, made by Shin-Etsu Chemical Co., Ltd.) was charged into a RMO-2H Spartan-Ryuzer mixing granulator device (agitator device) (having an effective capacity of 2 liters), made by Dalton Co., Ltd. which had, as shown in FIG. 1, agitation rotary blades attached to a first rotary shaft that was horizontally rotated at a central portion of an agitation vessel and a ribbon-shaped agitation blade attached around the agitation rotary blades and rotated in the opposite direction. The rotary blades were rotated at 4,700 rpm, and the ribbon-shaped agitator blade was rotated around the rotary blades at 25 rpm in the opposite direction to cause the powder to be fluidized. 2.5 g of sodium dioctyl sulfosuccinate (commercial name of Rapisol A-80), available from NOF Corporation, was weighed for use as a wetting agent and dispersed in 20 g of water. While inserting into the device at 0.03 MPa, the dispersion was sprayed over and added to the powder by means of a two-fluid nozzle at an air pressure of 0.15 MPa, followed by fluidizing and agitating for one minute.

The resulting hydroxypropyl methylcellulose powder was such that the amount of powder passing through a sieve of No. 140 sieve (with an opening of 106 μm) described in the Japanese Pharmacopoeia 14$^{th}$ edition B-1061 was 77% by weight with an average size being at 70 μm.

245 ml of pure water at 25° C. was charged into a 300 ml tall beaker having agitation blades rotating at 700 rpm, into which 5 g of the thus obtained hydroxypropyl methylcellulose powder was charged, followed by agitation for 30 minutes to obtain a uniform, viscous solution which was free of an undissolved powder.

Example 2

The general procedure of Example 1 was repeated except that the hydroxypropyl methyl cellulose powder used in Example 1 was replaced by hydroxypropyl cellulose M available from Nippon Soda Co., Ltd., 0.25 g of sorbitan monocaprylic acid ester (commercial name: Ceramisol C08) available from NOF Corporation was provided as a wetting agent, and 10 g of water was used for the dispersion to carry out cold water-solubility improving treatment.

Sieving was carried out in the same manner as in Example 1 to obtain a water-soluble polymer powder wherein the amount of powder passing through a sieve of Sieve No. 140 (with an opening of 106 μm) described in the Japanese Pharmacopoeia 14$^{th}$ edition B-1061 was 66% by weight, with an average particle size of 72 μm. The thus obtained powder was subjected to measurement of a time required for dissolution in the same manner as in Example 1, revealing dissolution within 30 minutes.

Example 3

The general procedure of Example 1 was repeated using, as powdery hydroxypropyl methylcellulose, particulate hydroxypropyl methylcellulose 60SH-10000G (a residual amount on a sieve of Sieve No. 30 (with an opening of 500 μm) described in the Japanese Pharmacopoeia 14$^{th}$ edition B-1061 was at 9.8% by weight, and the amount of powder passing through a sieve of Sieve No. 140 (with an opening of 106 μm) was at 12% by weight, with an average particle size of 190 μm) made by Shin-Etsu Chemical Co., Ltd., as a wetting agent, 0.25 g of sorbitan monocaprylic acid ester (commercial name: Ceramisole C08) made by NOF Corporation, and 10 g of water for dispersion, thereby carrying out cold water-solubility improving treatment. Sieving was carried out in the same manner as in Example 1 to obtain hydroxypropyl methylcellulose particles wherein the residual amount on a sieve of Sieve No. 30 (with an opening of 500 μm) described in the Japanese Pharmacopoeia 14$^{th}$ edition B-1061 was 9.8% by weight, the amount of particles passing through a sieve of Sieve No. 140 (with an opening of 106 μm) was 12% by weight, and an average particle size was at 185 μm. The thus obtained particles were subjected to measurement of a time required for dissolution in the same manner as in Example 1, revealing dissolution within 60 minutes.

Comparative Example 1

Hydroxypropyl methylcellulose of the type used in Example 1 was assessed with respect to solubility in the same manner as in Example 1 without treating in RMO-2H (with an effective capacity of 2 liters) Spartan Ryuzer mixer and granulator device, made by Dalton Co., Ltd., revealing that undissolved powder was formed in water and a little thereof was left after a lapse of 15 hours.

Comparative Example 2

Hydroxypropyl cellulose of the type used in Example 2 was assessed with respect to solubility in the same manner as in Example 1 without treating in RMO-2H (with an effective capacity of 2 liters) Spartan Ryuzer mixer and granulator device, made by Dalton Co., Ltd., revealing that undissolved powder was formed in water and a little thereof was left after a lapse of 15 hours.

Comparative Example 3

Hydroxypropyl methylcellulose of the type used in Example 3 was assessed with respect to solubility in the same manner as in Example 1 without treating in RMO-2H (with an effective capacity of 2 liters) Spartan Ryuzer mixer and granulator device, made by Dalton Co., Ltd., revealing that undissolved powder was formed in water and a little thereof was left after a lapse of 15 hours.

Japanese Patent Application No. 2004-285662 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing cold water-soluble polymer particles comprising subjecting a liquid containing a wetting agent or a powder of the wetting agent to dropping or spraying over or mixing with starting water-soluble polymer particles while fluidizing the starting polymer particles without subsequent forced drying and grinding of the resulting particles, wherein said water soluble polymer particles are flown using a device which has one or more rotary shafts of agitation blades of agitators capable of flowing said water-soluble polymer particles and attached horizontally, and wherein at least one rotary shaft is rotated at 1,500 rpm or over.

2. The method of claim 1 wherein said wetting agent is a member selected from the group consisting of nonionic surface active agents, anionic surface active agents and cationic surface active agents.

3. The method of claim 1 wherein said starting particles and said resulting particles are, respectively, in the form of a powder wherein the amount of powder passing through a sieve of Sieve No. 140 (with an opening of 106 μm) defined in the Japanese Pharmacopoeia 14th edition B-1061 is at least 30% by weight.

4. The method of claim 1 wherein said starting particles and said resulting particles are, respectively, in the form of a powder wherein the amount of powder passing through a sieve of Sieve No. 140 (with an opening of 106 μm) defined in the Japanese Pharmacopoeia 14th edition B-1061 is less than 30% by weight and the residual amount on a sieve of Sieve No. 30 (with an opening of 500 μm) is not larger than 10% by weight.

5. The method of claim 1 wherein said water soluble polymer is methyl cellulose, hydroxyethyl cellulose, hydroxypropyl methylcellulose, hydroxyethyl methylcellulose, hydroxyethyl ethylcellulose, hydroxyethyl hydroxypropyl cellulose, hydroxypropyl cellulose, hydroxybutyl cellulose or carboxymethylcellulose.

6. The method of claim 1 wherein, when said one or more rotary shafts is a first shaft or shafts, said device further comprises a second shaft having a ribbon-shaped or basket-shaped agitation blade arranged along an inner wall of said device, said second shaft being rotated in a direction opposite to the first rotary shaft within a range of 10 to 1,000 rpm.

* * * * *